(12) United States Patent
Bao

(10) Patent No.: US 12,109,990 B2
(45) Date of Patent: Oct. 8, 2024

(54) VEHICLE WHEEL STOPPER

(71) Applicant: Shanghai Yinta Network Technology Co., Ltd., Pilot Free Trade Zone (CN)

(72) Inventor: Junling Bao, Pilot Free Trade Zone (CN)

(73) Assignee: SHANGHAI YINTA NETWORK TECHNOLOGY CO., LTD., Pilot Free Trade Zone (CN)

( * ) Notice: Subject to any disclaimer, the term of this patent is extended or adjusted under 35 U.S.C. 154(b) by 328 days.

(21) Appl. No.: 17/690,460

(22) Filed: Mar. 9, 2022

(65) Prior Publication Data
US 2022/0306054 A1    Sep. 29, 2022

(30) Foreign Application Priority Data
Mar. 26, 2021   (CN) .......................... 202110326677.4

(51) Int. Cl.
*B60T 3/00*   (2006.01)
*B60T 1/04*   (2006.01)

(52) U.S. Cl.
CPC ...................................... *B60T 3/00* (2013.01)

(58) Field of Classification Search
CPC .............. B60T 1/005; B60T 1/04; B60T 3/00
See application file for complete search history.

(56) References Cited

U.S. PATENT DOCUMENTS

| 3,760,906 | A | * | 9/1973 | McGee | B60T 1/04 188/4 R |
| 4,934,489 | A | * | 6/1990 | Jackson | B60T 3/00 188/74 |
| D347,821 | S | * | 6/1994 | Few | D12/217 |
| 5,392,880 | A | * | 2/1995 | Christian | B60T 3/00 188/32 |
| 5,490,582 | A | * | 2/1996 | Trowbridge | B60T 3/00 188/74 |
| 8,365,875 | B2 | * | 2/2013 | Garceau | B60T 3/00 254/122 |
| 9,610,924 | B1 | * | 4/2017 | Searer | B60T 3/00 |
| D959,350 | S | * | 8/2022 | Lu | D12/217 |
| D970,422 | S | * | 11/2022 | Lu | D12/217 |
| D971,812 | S | * | 12/2022 | Zheng | D12/217 |
| D974,989 | S | * | 1/2023 | Yue | D12/217 |

(Continued)

*Primary Examiner* — Thomas W Irvin
(74) *Attorney, Agent, or Firm* — Lowe Graham Jones PLLC; Ellen M. Bierman

(57) ABSTRACT

Provided is a vehicle wheel stopper. The vehicle wheel stopper includes a bracket, clamping jaws and a telescoping rod assembly. The clamping jaws include a first clamping jaw and a second clamping jaw. Both the first clamping jaw and the second clamping jaw are pivotally connected to the bracket. The telescoping rod assembly includes a telescoping rod set and a gear set. The gear set drives the telescoping rod set to rotate around an axis of the telescoping rod set, and the telescoping rod set simultaneously drives the first clamping jaw and the second clamping jaw so that the first clamping jaw and the second clamping jaw separately have a first state of simultaneously clamping the two spaced wheels and a second state of simultaneously loosening the two spaced wheels. In this device, the wrench rotates the gear set within a range of 360° to further drive the support rod.

9 Claims, 2 Drawing Sheets

(56) References Cited

U.S. PATENT DOCUMENTS

| | | | | |
|---|---|---|---|---|
| 11,713,026 B2* | 8/2023 | Lu | ............................ | B60T 3/00 |
| | | | | 188/75 |
| 2002/0096402 A1* | 7/2002 | Tallman | .................. | B60P 3/075 |
| | | | | 188/4 R |
| 2010/0140026 A1* | 6/2010 | Garceau | .................... | B60T 3/00 |
| | | | | 188/69 |
| 2021/0362694 A1* | 11/2021 | Lu | ............................ | B60T 1/04 |

* cited by examiner

VEHICLE WHEEL STOPPER

CROSS-REFERENCE TO RELATED APPLICATIONS

This application claims benefit of Chinese Patent Application No. 202110326677.4, filed Mar. 26, 2021, published as Chinese CN 112849102 on May 28, 2021, which application is incorporated herein by reference in its entirety.

TECHNICAL FIELD

The present disclosure relates to the technical field of vehicle parts, in particular, a vehicle wheel stopper.

BACKGROUND

The previous patent application No. CN209888836U discloses an X-shaped vehicle parking assist stabilizer, including an X-shaped hinge frame, a wheel adapter platen, a first end shaft member, a second end shaft member, a screw rod. The X-shaped hinge frame comprises two X-shaped hinge members. The wheel adapter platen is fixedly installed through a connection shaft. The first end shaft member is provided with a through hole, the second end shaft member is provided with an internal threaded hole, and the first end shaft member and the second end shaft member are erected at both ends of the X-shaped hinge frame through a first end connection piece and a second end connection piece, respectively. At least part of the screw rod is provided with screw threads, and a screw head fitted with a wrench is disposed at a rear end of the screw rod. The screw rod is inserted into the through hole of the first end shaft member and engaged with the internal threaded hole of the second end shaft member through the screw threads on the screw rod, and a position of the second end shaft member is changed by rotating the screw rod so as to enable the X-shaped hinge frame to be unfolded or folded.

Such device uses a wrench to rotate the end or the middle part of the shaft product or the screw rod to adjust the X-shaped hinge frame to a corresponding angle so as to stop the movement, but usage disadvantages of this device and the wrench are that the wrench can only rotate within a range of 180° (the wrench needs to rotate back and forth repeatedly to reach the corresponding angle), and the efficiency is low and the installation time is long during the use.

BRIEF SUMMARY

The present disclosure describes a vehicle wheel stopper to solve the problems that the wrench can only rotate within a range of 180° (the wrench needs to rotate back and forth repeatedly to reach a corresponding angle) in the related art, and the efficiency is low and the installation time is long during the use.

The present disclosure provides a vehicle wheel stopper. Two wheels on one side of a vehicle are spaced apart from each other. The vehicle wheel stopper includes: a bracket, clamping jaws and a telescoping rod assembly.

The clamping jaws include a first clamping jaw and a second clamping jaw. Both the first clamping jaw and the second clamping jaw are pivotally connected to the bracket.

The telescoping rod assembly includes a telescoping rod set and a gear set. The gear set is configured to drive the telescoping rod set to rotate around an axis of the telescoping rod set, and the telescoping rod set is configured to simultaneously drive the first clamping jaw and the second clamping jaw such that the first clamping jaw and the second clamping jaw separately have a first state of simultaneously clamping the two spaced wheels and a second state of simultaneously loosening the two spaced wheels.

In some embodiments of the vehicle wheel stopper, the telescoping rod assembly includes a telescoping rod and a support rod, the gear set is configured to drive the support rod to rotate about an axis of the support rod, and the support rod is configured to drive the telescoping rod to simultaneously move in a direction facing away from the support rod or in a direction facing toward the support rod, and the telescoping rod is configured to drive the first clamping jaw and the second clamping jaw to switch between the first state and the second state.

In some embodiments of the vehicle wheel stopper, the telescoping rod includes a first telescoping rod and a second telescoping rod, the support rod is configured to rotate around the axis of the support rod such that the first telescoping rod and the second telescoping rod move simultaneously in the direction facing away from the support rod or in the direction facing toward the support rod, and the first telescoping rod and the second telescoping rod is configured to simultaneously drive the first clamping jaw and the second clamping jaw to switch between the first state and the second state.

In some embodiments of the vehicle wheel stopper, both ends of the support rod are respectively provided with a threaded hole, one end of the first telescoping rod is screwed with one end of the support rod, and one end of the second telescoping rod is screwed with another end of the support rod.

In some embodiments of the vehicle wheel stopper, the gear set includes a first bevel gear and a second bevel gear, the support rod is fixedly connected to the first bevel gear, the second bevel gear is meshed with the first bevel gear, and the second bevel gear is rotatably connected to the bracket, and the second bevel gear is configured to rotate around an axis of the second bevel gear to drive the first bevel gear to rotate around an axis of the first bevel gear.

In some embodiments of the vehicle wheel stopper, the bracket is provided with a mounting bin, the gear set is disposed in the mounting bin, the support rod penetrates through the mounting bin, the support rod is fixedly provided with a limiting member, and the limiting member is configured to limit a relative position between the bracket and the support rod.

In some embodiments of the vehicle wheel stopper, the first clamping jaw includes a pair of first clamping plates, the second clamping jaw comprises a pair of second clamping plates, and ends on one side of the pair of first clamping plates and ends on one side of the pair of second clamping plates are both pivotally connected to the bracket.

In some embodiments of the vehicle wheel stopper, the telescoping rod set further includes a pair of first pulling arms and a pair of second pulling arms, ends on one side of the pair of the first pulling arms are pivotally connected to the pair of the first clamping plates, respectively, ends on another side of the pair of first pulling arms are pivotally connected to the first telescoping rod and the second telescoping rod, respectively, ends on one side of the pair of second pulling arms are pivotally connected to the pair of second clamping plates, respectively, and ends on another side of the pair of second pulling arms are pivotally connected to the first telescoping rod and the second telescoping rod, respectively.

In some embodiments of the vehicle wheel stopper, the vehicle wheel stopper is symmetrically disposed along an axis of the telescoping rod.

In some embodiments of the vehicle wheel stopper, ends on another side of the pair of first clamping plates and ends on another side of the pair of second clamping plates are pivotally connected to support plates, and the support plates abut against the wheels.

The various embodiments may be combined to achieve different embodiments and has beneficial effects described below.

Figure 1:
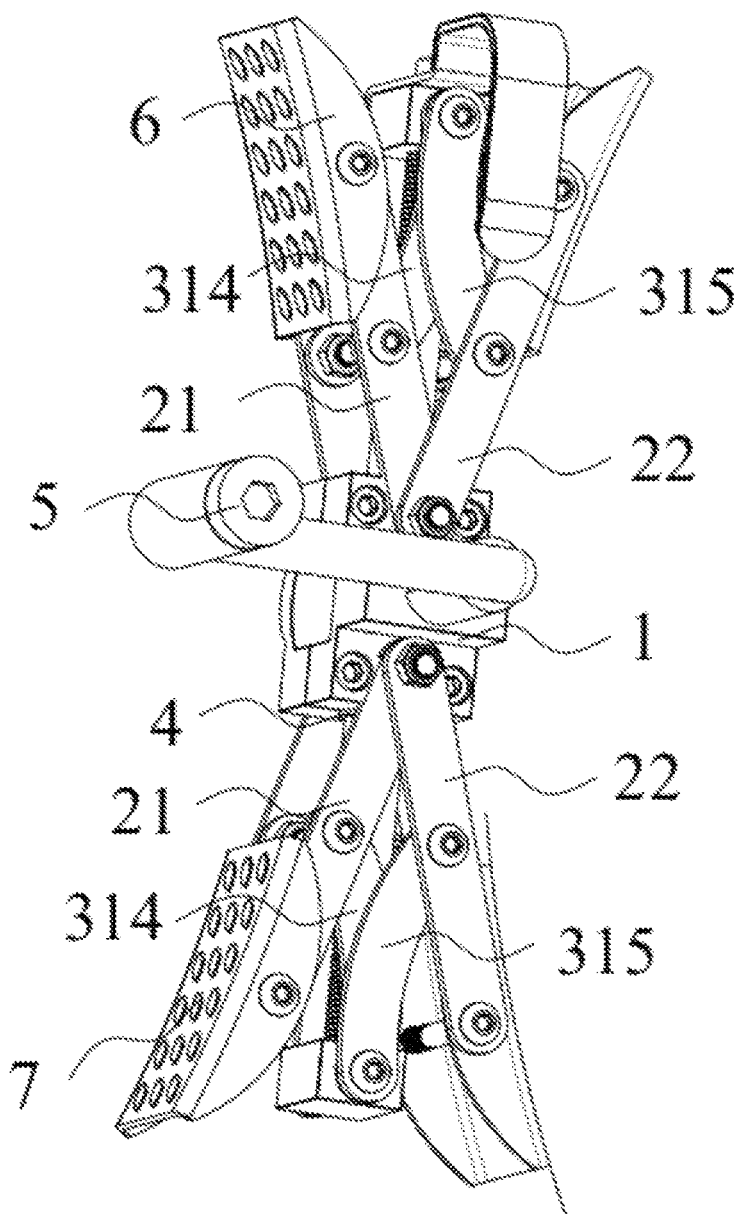
FIG. 1 is a structural diagram of a vehicle wheel stopper according to an example embodiment of the present disclosure.

REFERENCE LIST 1 bracket
21 first clamping plate
22 second clamping plate
31 telescoping rod set
311 support rod
312 first telescoping rod
313 second telescoping rod
314 first pulling arm
315 second pulling arm
32 gear set
321 first bevel gear
322 second bevel gear
4 limiting member
5 wrench
6 support plate
7 protrusion

DETAILED DESCRIPTION

The present disclosure describes a vehicle wheel stopper of an example embodiment. Two wheels on one side of the vehicle are spaced from each other. The vehicle wheel stopper includes: the bracket, the clamping jaws and the telescoping rod assembly. The clamping jaws include the first clamping jaw and the second clamping jaw. Both the first clamping jaw and the second clamping jaw are pivotally connected to the bracket. The telescoping rod assembly includes the telescoping rod set and the gear set. The gear set drives the telescoping rod set to rotate around the axis of the telescoping rod set, and the telescoping rod set simultaneously drives the first clamping jaw and the second clamping jaw so that the first clamping jaw and the second clamping jaw separately have a first state of simultaneously clamping the two spaced wheels and a second state of simultaneously loosening the two spaced wheels. When the first clamping jaw and the second clamping jaw are in the first state, the wheels are in a stop state. Since both the first clamping jaw and the second clamping jaw are pivotally connected to the bracket, two adjacent wheels enable the first clamping jaw and the second clamping jaw to be simultaneously subjected to forces having the same magnitude and opposite directions, respectively, so that this device cannot be loosened under the action of an external force while achieving a braking effect. Meanwhile, when the telescoping rod set is driven, compared with the case that the telescoping rod set is directly driven by a wrench, the telescoping rod set 31 is driven by the gear set 32, such that a rotation axis of the wrench can be changed. Through the rotation of the gear set of this device, the rotation axis of the wrench is perpendicular to a plane where the first clamping jaw and the second clamping jaw which are in the second state are located, so that the wrench can rotate within a range of 360°, thereby improving the use efficiency.

The solutions of the present disclosure will be described clearly and completely in conjunction with drawings. Apparently, the example embodiments described are part, not all, of the embodiments of the present disclosure. Based on the example embodiments of the present disclosure, all other embodiments obtained by those skilled in the art without creative work are within the scope of the present disclosure.

In the description of the present disclosure, it should be understood that the orientational or positional relationships indicated by terms "center", "above", "below", "left", "right", "vertical", "horizontal", "inside", "outside" and the like are based on the orientational or positional relationships illustrated in the drawings, which are for the mere purpose of facilitating and simplifying the description of the present disclosure, and these relationships do not indicate or imply that the device or component referred to has a specific orientation and is constructed and operated in a specific orientation, and thus it is not to be construed as limiting the present disclosure.

In addition, terms such as "first" and "second" are used merely for the purpose of description and are not to be construed as indicating or implying relative importance. And the terms "first position" and "second position" are two different positions. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of the present disclosure, it is to be noted that unless otherwise expressly specified and limited, the term "mounted", "connected to each other" or "connected" should be construed in a broad sense as securely connected, detachably connected or integrally connected; mechanically connected or electrically connected; directly connected to each other or indirectly connected to each other via an intermediary; or intraconnected between two components. For those of ordinary skill in the art, specific meanings of the preceding terms in the present disclosure may be construed based on specific situations.

The example embodiments of the present disclosure are described in detail below, and examples of the embodiments are illustrated in the drawings, where the same or similar reference numerals indicate the same or similar elements or elements having the same or similar functions. The example embodiments described below with reference to the drawings are merely exemplary and intended to explain the present disclosure, and are not to be construed as limiting the present disclosure.

Figure 2:
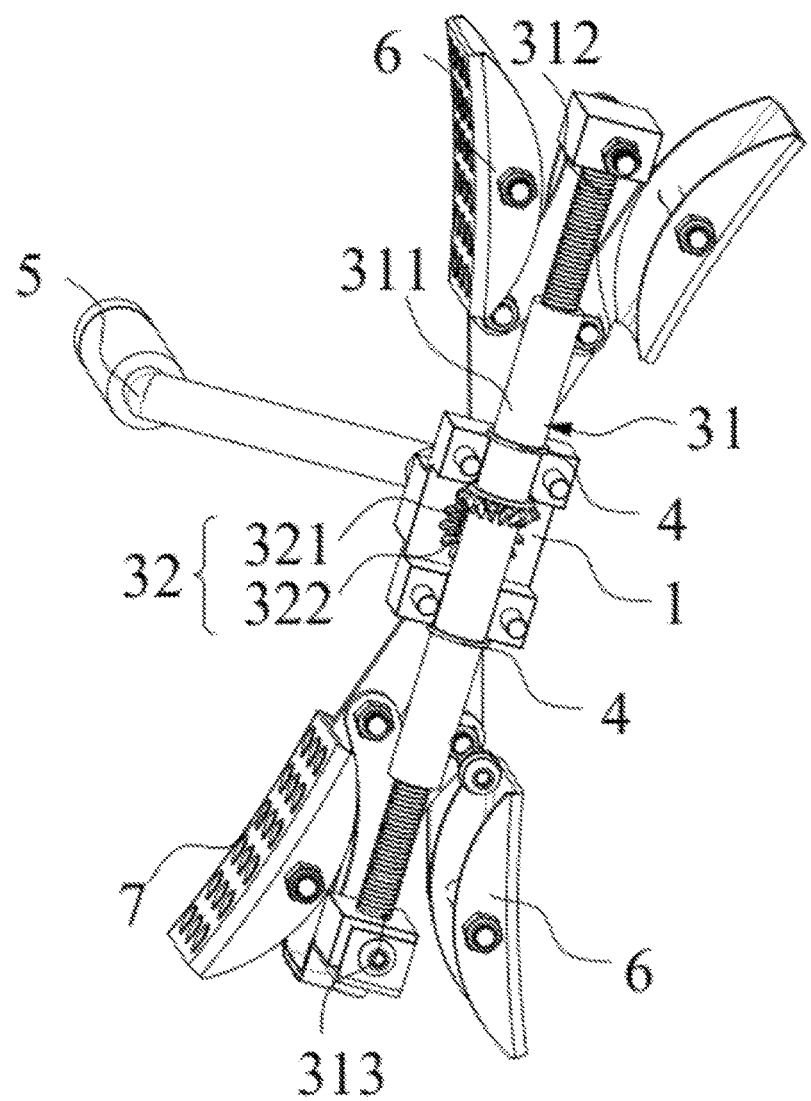
FIG. 2 is a partially disassembling structural diagram of a telescoping rod assembly of a vehicle wheel stopper according to an example embodiment of the present disclosure.
Figure 3:
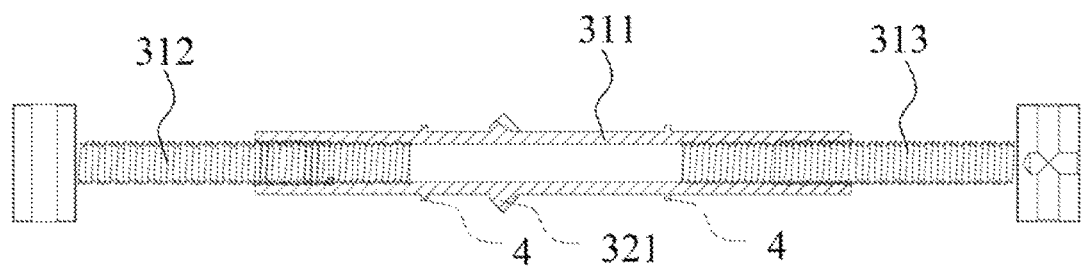
FIG. 3 is a sectional view of a telescoping rod set of a vehicle wheel stopper according to an example embodiment of the present disclosure.

As shown in FIGS. 1 to 3, the present disclosure provides a vehicle wheel stopper. Two wheels on one side of a vehicle are spaced apart from each other. The vehicle wheel stopper includes a bracket 1, clamping jaws, and a telescoping rod assembly. The clamping jaws include a first clamping jaw and a second clamping jaw. Both the first clamping jaw and the second clamping jaw are pivotally connected to the bracket. The telescoping rod assembly includes a telescoping rod set 31 and a gear set 32. The gear set 32 drives the telescoping rod set 31 to rotate around an axis of the telescoping rod set 31. The telescoping rod set 31 simultaneously drives the first clamping jaw and the second clamping jaw, so that the first clamping jaw and the second clamping jaw separately have a first state of simultaneously clamping the two wheels spaced apart from each other and separately have a second state of simultaneously loosening the two wheels spaced apart from each other. In a case where the first clamping jaw and the second clamping jaw are in the first state, the wheels are in a stop state. Since both the first clamping jaw and the second clamping jaw are pivotally connected to the bracket 1, the two adjacent wheels enable the first clamping jaw and the second clamping jaw to be simultaneously subjected to forces having the same magnitude and opposite directions, respectively, so that this device cannot be loosened under the action of an external force while achieving a braking effect. Therefore, using the improved device of FIGS. 1-3. the problems in the related art, namely that a triangle-like anti-slip stopper is easy to retreat due to the extrusion of the tire, and the tire runs over the anti-slip stopper, which causes a case that the anti-slip and anti-retreat effects cannot be achieved, the reliability is poor, and the use is not safe, can be solved. When the vehicle is about to leave, the first clamping jaw and the second clamping jaw are switched from the first state to the second state, and the vehicle wheel stopper can be removed.

Meanwhile, in contrast to the case that the telescoping rod set 31 is directly driven by a wrench, in the present disclosure, when the telescoping rod set 31 is driven by the gear set 32, a rotation axis of the wrench can be changed. Through the rotation of the gear set 32 of this device, the rotation axis of the wrench is perpendicular to a plane where the first clamping jaw and the second clamping jaw which are in the second state are located, so that the wrench can rotate within a range of 360°, thereby improving the use efficiency and reducing the installation time.

Optionally, the telescoping rod set 31 includes a telescoping rod and a support rod 311, the gear set 32 drives the support rod 311 to rotate around an axis of the support rod 311, and the support rod 311 drives the telescoping rod to move simultaneously in a direction facing away from the support rod 311 or in a direction facing toward the support rod 311. The telescoping rod drives the first clamping jaw and the second clamping jaw to switch between the first state and the second state. In this example embodiment, both ends of the telescoping rod are driven by the support rod 311 and simultaneously move in opposite directions.

Optionally, the telescoping rod includes a first telescoping rod 312 and a second telescoping rod 313, the support rod 311 rotates around an axis of the support rod 311 so that the first telescoping rod 312 and the second telescoping rod 313 can move simultaneously in a direction facing away from the support rod 311 or in a direction facing toward the support rod 311. The first telescoping rod 312 and the second telescoping rod 313 simultaneously drive the first clamping jaw and the second clamping jaw to switch between the first state and the second state. In this example embodiment, the support rod 311 simultaneously drives the first telescoping rod 312 and the second telescoping rod 313 to move in opposite directions simultaneously. Optionally, both ends of the support rod 311 are provided with threaded holes, one end of the first telescoping rod 312 is screwed with one end of the support rod 311, and one end of the second telescoping rod 313 is screwed with the another end of the support rod 311. Specifically, screw threads on the first telescoping rod 312 and the second telescoping rod 313 are drive screw threads, screw threads on the hole wall of the threaded holes at the both ends of the support rod 311 are drive screw threads. In this example embodiment, the threaded holes at the both ends of the support rod 311 are not the same. In other example embodiments, the support rod 311 is provided with penetrating threaded holes. A depth of the threaded holes at the both ends of the support rod 311 is determined by a distance between the two spaced wheels, a clamping angle of the first clamping jaw, a clamping angle of the second clamping jaw, a length of the first telescoping rod 312 and a length of the second telescoping rod 313

Optionally, the gear set 32 includes a first bevel gear 321 and a second bevel gear 322. The support rod 311 is fixedly connected to the first bevel gear 321, and the second bevel gear 322 is meshed with the first bevel gear 321 The second bevel gear 322 is rotatably connected to the bracket 1, and the second bevel gear 322 rotates around an axis of the second bevel gear 322 to drive the first bevel gear 321 to rotate around an axis of the first bevel gear 321. In this embodiment, the second bevel gear 322 is meshed with the first bevel gear 321, the second bevel gear 322 rotates to drive the first bevel gear 321 to rotate, and the first bevel gear 321 rotates to enable the support rod 311 to rotate.

Optionally, the bracket 1 is provided with a mounting bin, the gear set 32 is disposed in the mounting bin, and the support rod 311 penetrates through the mounting bin. The support rod 311 is fixedly provided with a limiting member 4, and the limiting member 4 limits a relative position between the bracket 1 and the support rod 311. Specifically, the limiting member 4 is two limiting rings which are located outside the mounting bin and are separately abutted with the bracket 1. In this example embodiment, the vehicle wheel stopper further includes a wrench 5 which is placed outside the mounting bin and is fixedly connected to the second bevel gear 322. In this embodiment, an included angle between the first bevel gear 321 and the second bevel gear 322 is 90°. A support frame is provided with a mounting hole. An axis of the mounting hole is perpendicular to a plane swept by the first clamping jaw and the second clamping jaw when the first clamping jaw and the second clamping jaw are switched between the first state and the second state. One end of a gear shaft extends into the mounting hole and is fixedly connected to the second bevel gear 322. A gear shaft rotates and cooperates with the bracket 1. The wrench 5 is detachably connected to another end of the gear shaft. When the second bevel gear 322 is rotated by the wrench 5, the wrench 5 does not generate movement interference with the first clamping jaw, the second clamping jaw or the two spaced wheels. When the gear shaft is rotated by the wrench 5, the wrench is adjustable within a range of 360°. Compared with the existing solution wherein the wrench 5 is adjustable merely within a range of 180°, a device of the present disclosure has the advantages of high efficiency and short installation time. In addition, the limiting rings play a role of preventing the support rod 311 from sliding relative to the bracket 1. In other example embodiments, two limiting rings are disposed within the mounting pin, and abut against inner walls of the mounting pin, respectively. The limiting rings can not only limit the relative position between the support rod 311 and the bracket 1, but also be fixed on the support rod 311 and abut against two ends of the first bevel gear 321, respectively, thereby limiting a relative position between the first bevel gear 321 and the support rod 311. The limiting ring may be fixedly connected to the support rod 311 by integrally forming, screwing, welding, pin-connection, or the like.

Optionally, the first clamping jaw includes a pair of first clamping plates 21, the second clamping jaw includes a pair of second clamping plates 22, and ends on one side of the pair of first clamping plates 21 and ends on one side of the pair of second clamping plates 22 are both pivotally connected to the bracket 1. In this embodiment, the pair of first clamping plates 21 includes a pair of first front-layer clamping plates and a pair of first rear-layer clamping plates and the pair of first front-layer clamping plates and the pair of first rear-layer clamping plates are arranged at intervals and in one-to-one correspondence. The bracket 1 is disposed between the pair of first front-layer clamping plates and the pair of first rear-layer clamping plates, and the pair of first front-layer clamping plates and the pair of first rear-layer clamping plates are separately hinged with the bracket 1. The structure of the pair of second clamping plates 22 is the same as the structure of the pair of first clamping plates 21, and a connection mode of the pair of second clamping plates 22 with the bracket 1 is the same as a connection mode of the pair of first clamping plates 21 with the bracket 1, which will not be discussed in detail here. In this example embodiment, the pair of first clamping plates and the pair of second clamping plates are both provided with a front layer and a rear layer, such arrangement can increase the strength of the pair of first clamping plates and the strength of the pair of second clamping plates. In other embodiments, the pair of first clamping plates and the pair of second clamping plates both may be provided with one or more layers.

Optionally, the telescoping rod set 31 further includes a pair of first pulling arms 314 and a pair of second pulling arms 315. Ends on one side of the pair of the first pulling arms 314 are pivotally connected to the pair of the first clamping plates 21, respectively, and ends on another side of the pair of first pulling arms 314 are pivotally connected to the first telescoping rod 312 and the second telescoping rod 313, respectively. Ends on one side of the pair of second pulling arms 315 are pivotally connected to the pair of second clamping plates 22, respectively, and ends on another side of the pair of second pulling arms 315 are pivotally connected to the first telescoping rod 312 and the second telescoping rod 313, respectively. In this example embodiment, the pair of first pulling arms 314 includes a pair of first front-layer pulling arms and a pair of first rear-layer pulling arms, and the pair of first front-layer pulling arms and the pair of first rear-layer pulling arms are arranged at intervals and in one-to-one correspondence. Ends on one side of the pair of first front-layer pulling arms are pivotally connected to the pair of first front-layer clamping plates, respectively, and ends on another side of the pair of first front-layer pulling arms are pivotally connected to the first telescoping rod 312 and the second telescoping rod 313, respectively. Ends on one side of the pair of first rear-layer pulling arms are pivotally connected to the pair of first rear-layer clamping plates, respectively, and ends on another side of the pair of first rear-layer pulling arms are pivotally connected to the first telescoping rod 312 and the second telescoping rod 313, respectively. The structure of the pair of second pulling arms 315 is the same as the structure of the pair of first pulling arms 314, and a connection mode of the pair of second pulling arms 315 with the pair of second clamping plates 22 is the same as a connection mode of the pair of first pulling arms 314 with the pair of second clamping plates 22, which will not be discussed in detail here. In this embodiment, the pair of first pulling arms 314 and the pair of second pulling arms 315 are both provided with a front layer and a rear layer. In other example embodiments, the first pulling arms and the second pulling arms both may be provided with one or more layers. In this example embodiment, when the first telescoping rod 312 and the second telescoping rod 313 extend outward simultaneously, the pair of first pulling arms 314 and the pair of second pulling arms 315 simultaneously drive the pair of first clamping plates 21 and the pair of second clamping plates 22 to move, respectively, so that the pair of first clamping plates 21 and the pair of second clamping plates 22 are switched from the first state to the second state simultaneously. When the first telescoping rod 312 and the second telescoping rod 313 contract inward simultaneously, the pair of first pulling arms 314 and the pair of second pulling arms 315 simultaneously drive the pair of first clamping plates 21 and the pair of second clamping plates 22 to move, respectively, so that the pair of first clamping plates 21 and the pair of second clamping plates 22 are switched from the second state to the first state simultaneously. An included angle between the first clamping plates 21 and an included angle between the second clamping plates 22 both varies from 0° to 180°.

Optionally, the vehicle wheel stopper is symmetrically disposed along an axis of the telescoping rod. In this example embodiment, this symmetrical arrangement can achieve the synchronous movement of the pair of first clamping plates 21 and the pair of second clamping plates 22.

Optionally, ends on another side of the pair of first clamping plates 21 and ends on another side of the pair of second clamping plates 22 are pivotally connected to support plates 6, respectively. The support plates 6 abut against the wheels, respectively, which can increase a contact area between the pair of first clamping plates 21 and the wheel and a contact area between the pair of second clamping plates 22 and the wheel, thereby increasing a friction force.

Optionally, ends of the support plates 6 abutting against the wheels are separately provided with multiple protrusions 7 arranged at intervals. In this example embodiment, the protrusions 7 play a role of further increasing the friction force between the support plates 6 and the wheels. In other embodiments, the support plates 6 may also be provided with frosted surfaces or corrugated rubber surfaces, or the like.

The above example embodiments of the present disclosure are merely illustrative of the present disclosure and are not intended to limit the embodiments of the present disclosure. For those of ordinary skill in the art, alterations or modifications in other different forms can be made based on the above description. Implementations of the present disclosure cannot be and do not need to be all exhausted herein. Any modification, equivalent substitution and improvement within the spirit and principle of the present disclosure fall within the scope of the claims of the present disclosure.

The invention claimed is:

1. A vehicle wheel stopper, wherein two wheels on one side of a vehicle are spaced from each other, the vehicle wheel stopper comprising:
   a bracket;

clamping jaws, comprising a first clamping jaw and a second clamping jaw, wherein both the first clamping jaw and the second clamping jaw are pivotally connected to the bracket; and a telescoping rod assembly, which comprises a telescoping rod set and a gear set, wherein the telescoping rod assembly comprises a telescoping rod and a support rod, wherein the gear set is configured to drive the telescoping rod set to rotate around an axis of the telescoping rod set, and the telescoping rod set is configured to simultaneously drive the first clamping jaw and the second clamping jaw such that the first clamping jaw and the second clamping jaw separately have a first state of simultaneously clamping the two spaced wheels and a second state of simultaneously loosening the two spaced wheels, and wherein the gear set comprises a first bevel gear and a second bevel gear, wherein the support rod is fixedly connected to the first bevel gear, the second bevel gear is meshed with the first bevel gear, and the second bevel gear is rotatably connected to the bracket, and wherein the second bevel gear is configured to rotate around an axis of the second bevel gear so as to drive the first bevel gear to rotate around an axis of the first bevel gear to drive the first clamping jaw and the second clamping jaw to switch between the first state and the second state.

2. The vehicle wheel stopper of claim 1, wherein the gear set is configured to drive the support rod to rotate around an axis of the support rod, and wherein the support rod is configured to drive the telescoping rod to simultaneously move in a direction facing away from the support rod or in a direction facing toward the support rod, and wherein the telescoping rod is configured to drive the first clamping jaw and the second clamping jaw to switch between the first state and the second state.

3. The vehicle wheel stopper of claim 2, wherein the support rod is configured to rotate around the axis of the support rod such that the first telescoping rod and the second telescoping rod move simultaneously in the direction facing away from the support rod or in the direction facing toward the support rod, and wherein the first telescoping rod and the second telescoping rod are configured to simultaneously drive the first clamping jaw and the second clamping jaw to switch between the first state and the second state.

4. The vehicle wheel stopper of claim 3, wherein both ends of the support rod are respectively provided with a threaded hole, wherein one end of the first telescoping rod is screwed with one end of the support rod, and wherein one end of the second telescoping rod is screwed with another end of the support rod.

5. The vehicle wheel stopper of claim 3, wherein the first clamping jaw comprises a pair of first clamping plates, the second clamping jaw comprises a pair of second clamping plates, and ends on one side of the pair of first clamping plates and ends on one side of the pair of second clamping plates are both pivotally connected to the bracket.

6. The vehicle wheel stopper of claim 5, wherein the telescoping rod set further comprises a pair of first pulling arms and a pair of second pulling arms, wherein ends on one side of the pair of the first pulling arms are pivotally connected to the pair of the first clamping plates, respectively, wherein ends on another side of the pair of first pulling arms are pivotally connected to the first telescoping rod and the second telescoping rod, respectively, wherein ends on one side of the pair of second pulling arms are pivotally connected to the pair of second clamping plates, respectively, and wherein ends on another side of the pair of second pulling arms are pivotally connected to the first telescoping rod and the second telescoping rod, respectively.

7. The vehicle wheel stopper of claim 6, wherein the vehicle wheel stopper is symmetrically disposed along an axis of the telescoping rod.

8. The vehicle wheel stopper of claim 5, wherein ends on another side of the pair of first clamping plates and ends on another side of the pair of second clamping plates are pivotally connected to support plates, and the support plates abut against the wheels.

9. The vehicle wheel stopper of claim 2, wherein the bracket is provided with a mounting bin, the gear set is disposed in the mounting bin, the support rod penetrates through the mounting bin, the support rod is fixedly provided with a limiting member, and the limiting member is configured to limit a relative position between the bracket and the support rod.

* * * * *